US006595344B1

(12) United States Patent
Davis et al.

(10) Patent No.: US 6,595,344 B1
(45) Date of Patent: Jul. 22, 2003

(54) STRIP BARRIER BRUSH ASSEMBLY

(75) Inventors: Chris M. Davis, Midlothian, VA (US); Michael V. Zinn, Midlothian, VA (US)

(73) Assignee: Jason Incorporated, Conover, NC (US)

(*) Notice: Subject to any disclaimer, the term of this patent is extended or adjusted under 35 U.S.C. 154(b) by 99 days.

(21) Appl. No.: 09/645,253

(22) Filed: Aug. 24, 2000

(51) Int. Cl.[7] ............................................ B65G 43/00
(52) U.S. Cl. ..................................... 198/323; 198/326
(58) Field of Search ............................... 198/323, 326

(56) References Cited

U.S. PATENT DOCUMENTS

| | | | | |
|---|---|---|---|---|
| 2,193,583 A | | 3/1940 | Dunlop | |
| 2,846,045 A | | 8/1958 | Fowler | |
| 3,616,891 A | | 11/1971 | Eagle | |
| 3,986,595 A | | 10/1976 | Asano et al. | |
| 4,397,383 A | | 8/1983 | James | |
| 4,519,490 A | | 5/1985 | White | |
| D283,444 S | | 4/1986 | Allard | |
| D283,445 S | | 4/1986 | Allard | |
| 4,629,052 A | | 12/1986 | Kitamura | |
| 4,669,597 A | | 6/1987 | Langer et al. | |
| 5,042,641 A | | 8/1991 | Soldat | |
| 5,082,102 A | | 1/1992 | Reichmuth | |
| 5,242,042 A | | 9/1993 | Mauldin | |
| 5,810,147 A | * | 9/1998 | Vanmoor | 198/323 |
| 6,129,197 A | * | 10/2000 | Gore | 198/323 |
| 6,131,719 A | * | 10/2000 | Gore | 198/326 |
| 6,152,279 A | * | 11/2000 | Davis | 198/333 |

FOREIGN PATENT DOCUMENTS

| | | |
|---|---|---|
| GB | 2 069 438 A | 8/1981 |
| JP | 2-123092 A | 5/1990 |
| JP | 3-158387 A | 7/1991 |
| JP | 4-28692 A | 1/1992 |

OTHER PUBLICATIONS

Sealeze Corporation, 1989 Catalog, Date: 1989.
Sealeze Corporation, Escalator Safety Strip Brochure.
The Washington Post, "Metro Using Brushes on Escalator Gap Problem, " Date: Sep. 09, 1994.

* cited by examiner

*Primary Examiner*—Christopher P. Ellis
*Assistant Examiner*—Rashmi Sharma
(74) *Attorney, Agent, or Firm*—Renner, Otto, Boisselle & Sklar

(57) ABSTRACT

A strip brush moving surface guard mounted on a fixed surface and projecting over the edge of the moving surface includes a base for the strip brush and an elongated holder secured to the fixed surface. The holder includes a drop-in recess for the base with the primary horizontal fasteners for the holder extending through the recess so that they are concealed when the base is in place. Smaller secondary fasteners extend transversely of the primary fasteners or almost vertically to hold the strip brush base in place in the drop-in recess. The recess and base include mating pilot surfaces to facilitate the seating or placement of the base in the recess.

12 Claims, 2 Drawing Sheets

STRIP BARRIER BRUSH ASSEMBLY

This invention relates generally as indicated to a strip barrier brush assembly, and more particularly to a strip brush moving surface guard for protecting the gap at the lateral edges of the moving surface of a conveyor such as an escalator or walkway.

BACKGROUND OF THE INVENTION

Strip brushes have been used to protect the gap between the fixed side walls and the moving surface for escalators or walkways. The bristle tips usually project over the edge of the moving surface at a downwardly extending angle and nudge people or things away from the gap between the moving and fixed surfaces. Examples may be seen in published UK patent applications 2,343,668A, 2,332,411A, and 2,069,438A, as well as U.S. Pat. No. 5,810,147. Both single and double strip brush guards are sold under the trademark SEALEZE® by the Sealeze unit of Jason Incorporated of Richmond, Va., USA. SEALEZE® is a registered trademark of Jason Incorporated.

Most brush guard assemblies utilize a two piece holder construction utilizing an elongated mounting holder or extrusion fastened to the side wall into which the strip brush is fitted. If the mounting holes and hardware for the holder or extrusion are exposed, there exists the danger of tampering or vandalism. There is also the possibility of a riders fingers being caught or abraded by the hole or fastener. If such holes are in the base of a dove-tail slot as shown in UK application 2,332,411A, and the strip brush is threaded in from the end, the mounting holes and fasteners make the threading job much more difficult. It would accordingly be desirable if the strip brush could simply be dropped in a recess in the holder secured to the fixed surface, and be secured by fasteners not projecting horizontally while at the same time concealing the fasteners securing the holder to the fixed surface.

SUMMARY OF THE INVENTION

A strip brush moving surface guard includes an elongated holder secured to the fixed surface. The holder has a drop-in recess or slot adapted to receive a strip brush base. The primary fasteners for the holder extend horizontally through the recess and are concealed by the strip brush base when in position in the recess. Both the recess and the base have mating V-shape pilot surfaces to facilitate the seating of the base in the recess. The base includes a top flange overlying the holder and smaller secondary fasteners extend through the flange into the top of the holder almost vertically and transversely of the primary fasteners for the holder. The base includes a channel slot into which the strip brush is threaded, but no fasteners extend through the slot of the base. In this manner the primary fasteners are concealed and the secondary fasteners do not extend horizontally. Moreover, the guard is much easier to install since a strip brush does not have to be threaded through a channel or slot with fastener holes.

To the accomplishment of the foregoing and related ends the invention, then, comprises the features hereinafter fully described and particularly pointed out in the claims, the following description and the annexed drawings setting forth in detail certain illustrative embodiments of the invention, these being indicative, however, of but a few of the various ways in which the principles of the invention may be employed.

DETAILED DESCRIPTION OF THE PREFERRED EMBODIMENTS

Figure 1:
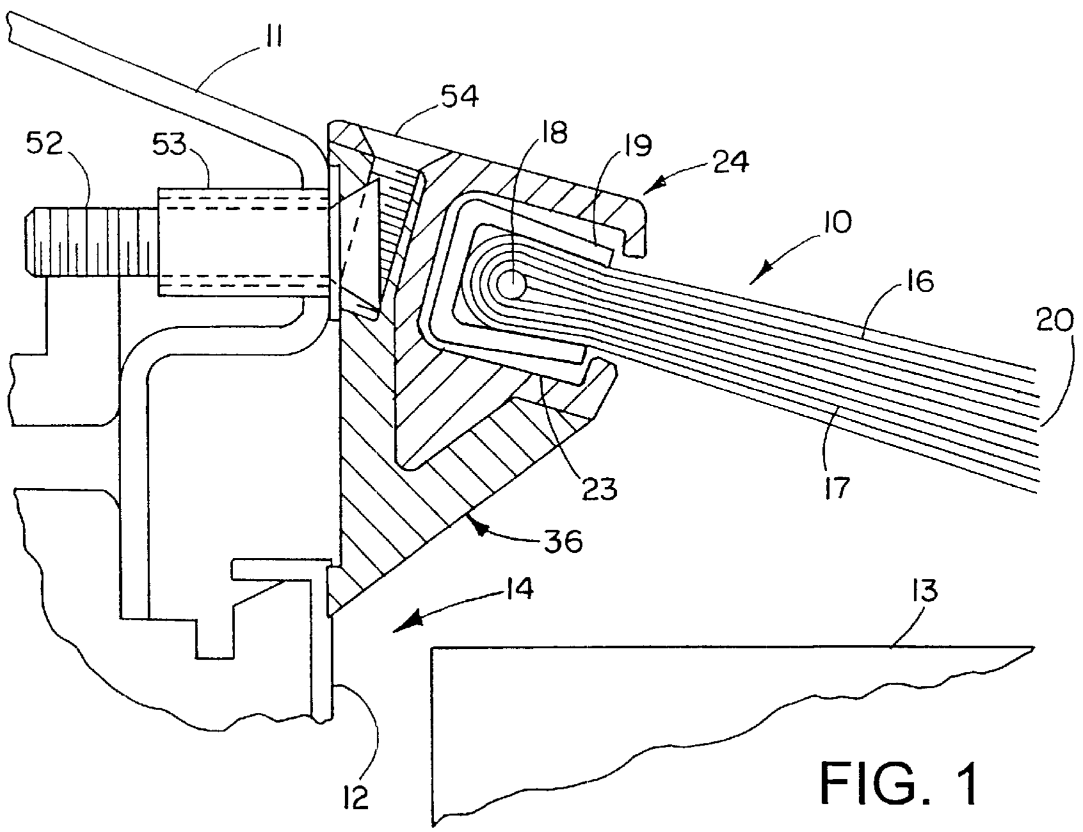
FIG. 1 is a fragmentary vertical section of the strip brush guard assembled.

Referring initially to FIG. 1 there is illustrated a moving surface strip brush guard assembly shown generally at 10 secured to a fixed surface comprising a balustrade 11 and a vertical wall 12 and projecting over a moving surface 13 to protect the gap shown at 14. An assembly which is a mirror image of that shown will be provided at the opposite edge of the moving surface.

The strip brush shown generally at 16 may be formed of plastic bristles 17 folded around a core wire 18 and clinched at the fold by channel 19. The strip brush has a trimmed face 20 adapted to engage objects or people nudging them away from the gap. The guard acts as a tell-tale reminding someone they are too close to the edge. The channel and core wire may be metal or plastic.

The strip brush 16 is threaded or inserted in channel 23 in elongated base shown generally at 24, and the axis of the brush extends at the downward angle shown so that the face is fairly close to the moving surface 13.

Figure 2:
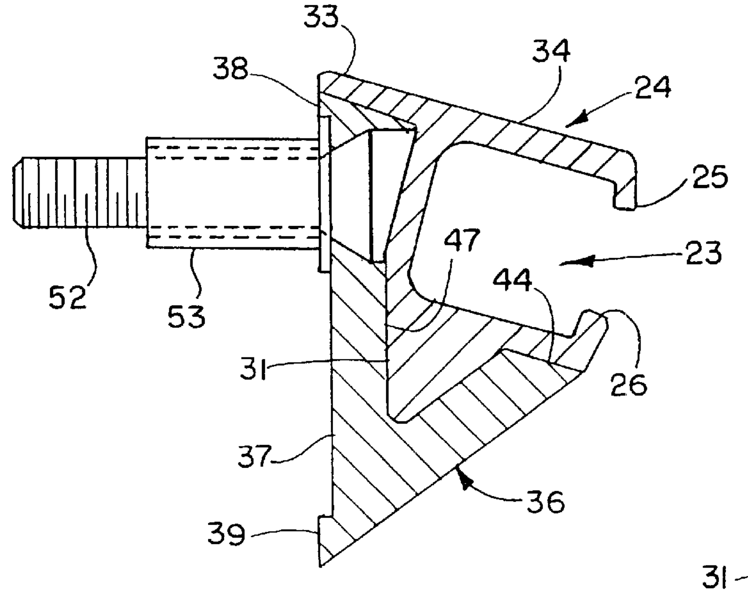
FIG. 2 is an assembly section broken away to show the primary horizontal fastener.
Figure 3:
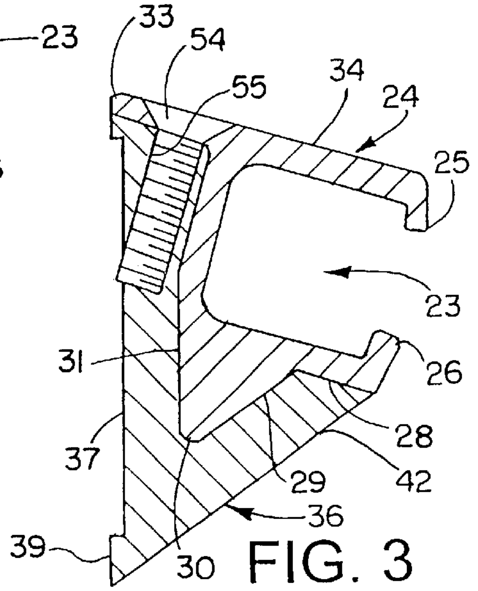
FIG. 3 is a similar assembly section broken away to show the smaller transverse or almost vertical fastener.
Figure 4:
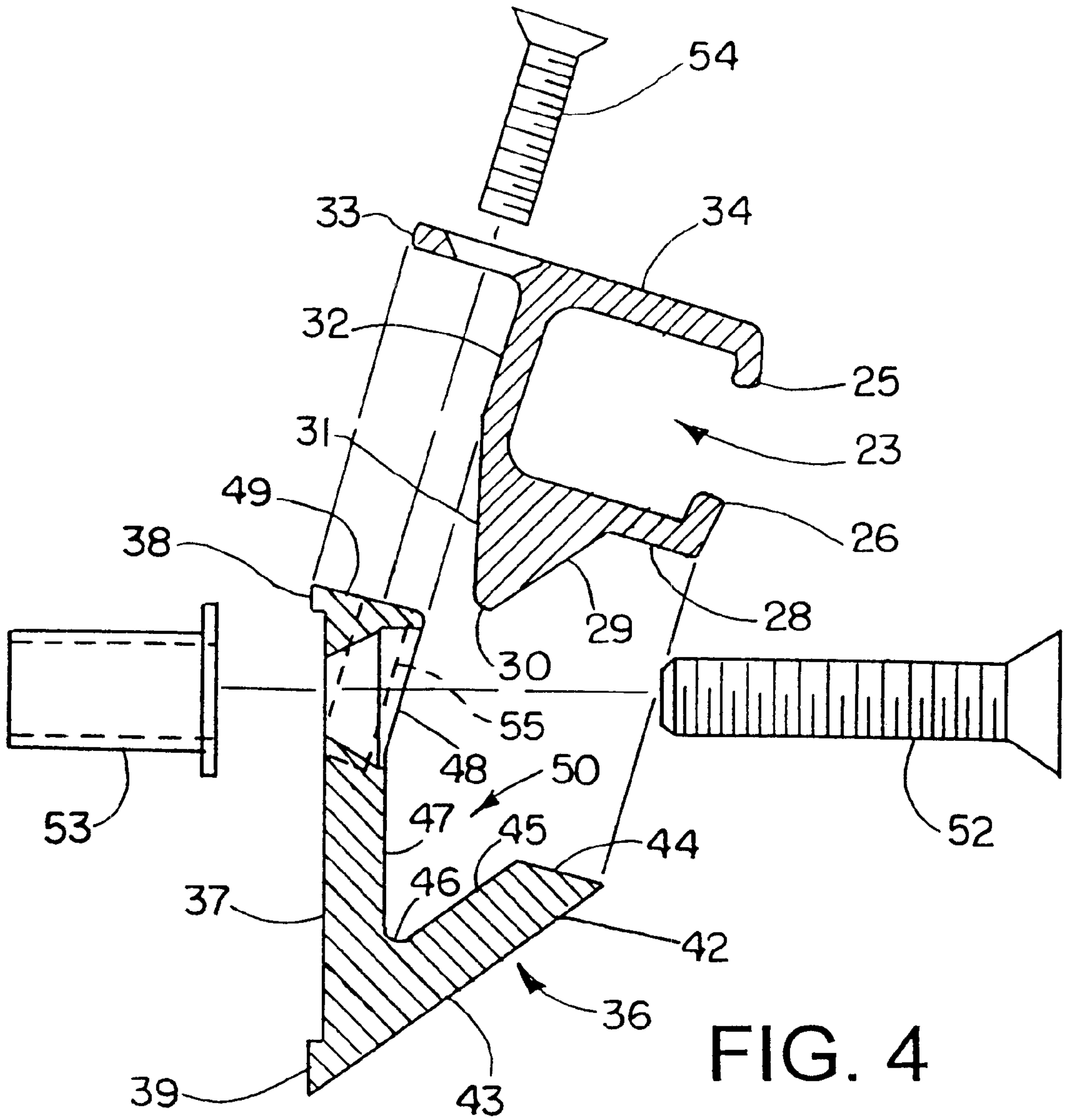
FIG. 4 is an exploded view showing the various components of the strip brush guard.

As seen additionally in FIGS. 2–4, the channel 23 is provided with inwardly projecting lips 25 and 26 which overlie the clinch channel 19 holding the brush in the base channel. The base includes a bottom wall 28 parallel to the axis of the channel which rearwardly joins a downwardly angled pilot surface 29 which terminates at radiused point 30 which is also the lower termination of vertical pilot surface 31. The two surfaces 29 and 31 form a V-shape pilot.

The back wall of the base includes surface 32 transverse the axis of the channel 23. The surface 32 terminates in flange 33 which is a continuation of and extends parallel to the upper exterior side 34 of the channel.

The holder shown generally at 36 is an elongated extrusion and has a rear surface 37 separated by upper and lower projecting feet 38 and 39, respectively.

The lower end of the holder includes an upwardly inclined leg 42 having a bottom surface 43, and end surface 44 and an inner inclined surface 45. The inner surface terminates at rounded crotch 46 as does vertical inner surface 47. The vertical surface extends upwardly to inclined surface 48 which terminates at the radiused corner joining the top surface 49. The surfaces of the holder are of the same extent and angular relationship as the facing surfaces on the base, so that the front of the holder forms a drop-in recess shown generally at 50 mating with the rear of the base. The mating V-shape pilot surfaces as well as the top flange on the base ensure an easy and proper seating of the base in the holder with the base being supported by all of the described surfaces of the holder except the rear surface 37 and the bottom exterior inclined surface 43.

The holder is secured to the balustrade by the primary horizontal fasteners 52 which include the inserts 53. The fasteners extend through the drop-in recess and are countersunk as illustrated. When the base is in the drop-in recess the primary fasteners and any countersinking are concealed. The base and holder may be a metal or plastic extrusion.

The base may be secured in its seated position by smaller secondary fasteners 54 which extend through the flange 33 into threaded sockets 55 in the top of the holder. The secondary fasteners extend almost vertically or transversely of the horizontal primary fasteners. It is noted that the brush and its base may be easily positioned in the drop-in recess, and no strip brush has to be threaded in a slot. There are no fasteners into the channel 23.

It will also be appreciated that instead of a single strip brush, two may be positioned side-by-side as in published U.K. application 2,343,668A.

It can now be seen that the parts may easily be assembled simply by placing the brush and base in the drop-in recess of the holder, and when in position the primary fasteners are completely concealed.

Although the invention has been shown and described with respect to certain preferred embodiments, it is obvious that equivalent alterations and modifications will occur to others skilled in the art upon the reading and understanding of this specification. The present invention includes all such equivalent alterations and modifications, and is limited only be the scope of the claims.

What is claimed is:

1. A strip brush moving surface edge guard mounted on a fixed surface and projecting over the edge of the moving surface, said guard comprising a strip brush projecting over the edge of the moving surface, a base for the strip brush, an elongated mounting holder for said strip brush secured to said fixed surface and having an upwardly opening drop-in recess for receiving said base, horizontally extending fasteners extending through said holder within said recess to secure said holder to said fixed surface, said base concealing said horizontally extending fasteners when seated in said upwardly opening drop-in recess.

2. A strip brush guard as set forth in claim 1 wherein said drop-in recess and said base include mating pilot surfaces to facilitate the placement of the base in recess.

3. A strip brush guard as set forth in claim 2 wherein said mating pilot surfaces are V-shape.

4. A strip brush guard as set forth in claim 3 wherein said V-shape pilot surfaces converge at their lower ends.

5. A strip brush guard as set forth in claim 4 wherein one of said pilot surfaces is substantially vertical.

6. A strip brush guard as set forth in claim 5 wherein said holder includes an upwardly inclined lower leg, the interior of which comprises one of said pilot surfaces.

7. A strip brush guard as set forth in claim 6 wherein said leg includes an end surface, and said base includes a parallel mating surface so that said base is supported on the pilot surface and the end surface.

8. A strip brush guard as set forth in claim 1 wherein said base includes a flange overlying said holder.

9. A strip brush guard as set forth in claim 8 wherein said flange and the top of said holder are downwardly angled.

10. A strip brush guard as set forth in claim 8 including secondary fasteners extending through said flange into the top of said holder.

11. A strip brush guard as set forth in claim 1 including secondary fasteners securing the base to the holder, said secondary fasteners extending substantially transversely of said horizontally extending fasteners.

12. A strip brush guard as set forth in claim 1 including a channel with a restricted opening in said base, and said strip brush mounted in said channel.

* * * * *